(12) United States Patent
Tanaka et al.

(10) Patent No.: US 9,273,777 B2
(45) Date of Patent: Mar. 1, 2016

(54) VEHICLE CONTROL APPARATUS

(75) Inventors: Nobuyuki Tanaka, Toyota (JP); Masaya Amano, Toyota (JP); Shunsuke Oyama, Aichi-ken (JP); Shoji Nagata, Anjo (JP)

(73) Assignees: TOYOTA JIDOSHA KABUSHIKI KAISHA, Aichi-ken (JP); AISIN AW CO., LTD., Aichi-ken (JP)

( * ) Notice: Subject to any disclaimer, the term of this patent is extended or adjusted under 35 U.S.C. 154(b) by 43 days.

(21) Appl. No.: 14/343,633

(22) PCT Filed: Sep. 10, 2012

(86) PCT No.: PCT/IB2012/001730
§ 371 (c)(1),
(2), (4) Date: May 30, 2014

(87) PCT Pub. No.: WO2013/038246
PCT Pub. Date: Mar. 21, 2013

(65) Prior Publication Data
US 2014/0366670 A1   Dec. 18, 2014

(30) Foreign Application Priority Data
Sep. 12, 2011  (JP) .................................. 2011-198216

(51) Int. Cl.
| | |
|---|---|
| B60W 50/12 | (2012.01) |
| F16H 61/02 | (2006.01) |
| B60K 6/445 | (2007.10) |
| B60K 6/543 | (2007.10) |
| B60W 50/10 | (2012.01) |
| F16H 61/16 | (2006.01) |
| B60W 50/00 | (2006.01) |

(52) U.S. Cl.
CPC ............ *F16H 61/0204* (2013.01); *B60K 6/445* (2013.01); *B60K 6/543* (2013.01); *B60W 50/10* (2013.01); *B60W 50/12* (2013.01); *F16H 61/16* (2013.01); *B60W 2050/0019* (2013.01); *B60W 2540/16* (2013.01); *F16H 2061/163* (2013.01); *Y02T 10/6239* (2013.01); *Y10T 74/2003* (2015.01)

(58) Field of Classification Search
CPC ................ F16H 61/0204; F16H 61/16; F16H 2061/163; B60W 50/12; B60W 2540/16; B60W 10/10; B60W 2540/10; Y10T 477/688; Y10T 477/692; Y10T 477/679
USPC ........................ 477/110, 115, 120; 701/60, 66
See application file for complete search history.

(56) References Cited

U.S. PATENT DOCUMENTS 4,551,802 A * 11/1985 Smyth .............................. 701/55
4,930,078 A *  5/1990 Dunkley et al. ................. 701/52

(Continued)

FOREIGN PATENT DOCUMENTS

| JP | 62-165052 A | 7/1987 |
|---|---|---|
| JP | 09-242868 A | 9/1997 |

(Continued)

*Primary Examiner* — Roger Pang
(74) *Attorney, Agent, or Firm* — Sughrue Mion, PLLC

(57) ABSTRACT

In a manual transmission mode, a downshift instruction signal is outputted by a position sensor, and a shift range is lowered by one gear, as a result of an operation of a shift lever by the driver. The driving force of the vehicle is increased through downshifting. The number of times of downshifting within a predefined time is limited to a predefined number of times.

8 Claims, 7 Drawing Sheets

(56) References Cited

U.S. PATENT DOCUMENTS

| | | | |
|---|---|---|---|
| 5,444,623 A * | 8/1995 | Genise | 701/52 |
| 5,738,607 A * | 4/1998 | Kondo et al. | 477/125 |
| 5,868,033 A | 2/1999 | Nishino et al. | |
| 5,908,369 A | 6/1999 | Nakauchi et al. | |
| 6,095,002 A * | 8/2000 | Tuson et al. | 74/335 |
| 6,108,600 A * | 8/2000 | Lehner | F16H 61/0403 477/135 |
| 2003/0060329 A1 | 3/2003 | Sato et al. | |
| 2007/0099752 A1 | 5/2007 | Saito et al. | |
| 2007/0232441 A1 * | 10/2007 | Gueter | 477/34 |
| 2009/0203481 A1 * | 8/2009 | Nohara | B60K 6/445 475/150 |

FOREIGN PATENT DOCUMENTS

| | | |
|---|---|---|
| JP | 1054454 A | 2/1998 |
| JP | 10-141494 A | 5/1998 |
| JP | 2003-097689 A | 4/2003 |
| JP | 2005-188649 A | 7/2005 |
| JP | 2007-120703 A | 5/2007 |
| JP | 2007-139059 A | 6/2007 |

* cited by examiner

F I G . 10
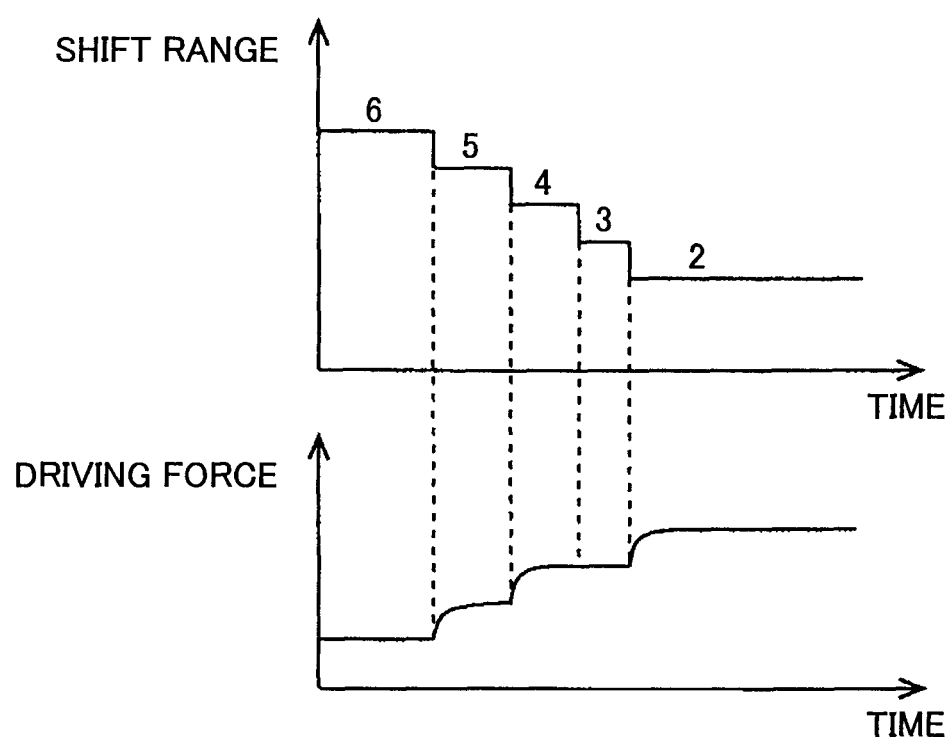

VEHICLE CONTROL APPARATUS

BACKGROUND OF THE INVENTION

1. Field of the Invention

The invention relates to a vehicle control apparatus, and more particularly, to a technology for limiting the number of times a driving force is increased through downshifting.

2. Description of Related Art

Electric automobiles and hybrid vehicles equipped with an electric motor as a drive source, as well as electric automobiles provided with a range extension function (range extender), are available. In many instances, these vehicles are not equipped with a stepped transmission that enables speed ratio modification. In such cases, the ratio between the revolutions of the drive source (for instance, an electric motor or engine) and axle revolutions, i.e. the speed ratio, need not be selected manually by the driver, to change the driving force of the vehicle thereby. In such vehicles, however, there is a need to provide the driver with the operating experience of changes in the driving force through shifting, as in ordinary vehicles equipped with an engine alone as the drive source. In order to meet that need, the shift range in some electric automobiles and hybrid vehicles is variable, and control is performed in such a way so as to obtain a travel characteristic according to a selected shift range.

However, enabling the driver to select the shift range makes it possible for the shift range to be modified based on an improper operation erroneously inputted by the driver. As an example of a measure for preventing such improper shifting, Japanese Patent Application Publication No. 9-242868 (JP 9-242868 A) discloses the feature of not accepting the input of a manual transmission instruction during a lapse of time from start of automatic shifting until a predefined time has elapsed.

In the case of an anomaly in an output system for outputting a shift instruction signal in a manual transmission mode, for instance in case of close-fail of a position switch for detecting the position of a shift lever, the shift instruction signal may in some instances be outputted a plurality of times within a short time, by the output system, in the manual transmission mode. The driving force of the vehicle may increase abruptly and the vehicle may experience a significant jolt, if a downshift instruction signal is outputted a plurality of times, within a short time, by the output system, in a manual transmission mode, and, accordingly, downshifting is performed a plurality times within a short time. However, JP 9-242868 A gives no consideration at all to an instance where a downshift instruction signal is outputted a plurality of times, within a short time, in a manual transmission mode.

SUMMARY OF THE INVENTION

The invention provides a vehicle control apparatus that suppresses excessive increases in driving force arising from downshifting in a manual transmission mode.

In an aspect of the invention, a vehicle control apparatus in which a driving force is increased through downshifting in a manual transmission mode has: an output unit that outputs a downshift instruction signal; and a limiting unit that limits, to a predefined number of times, a number of increases of the driving force through downshifting within a predefined time.

In this aspect there is limited the number of increases of the driving force through downshifting within a predefined time. In consequence, it becomes possible to limit the increment of driving force through downshifting. As a result, excessive increases in the driving force, due to downshifting in a manual transmission mode, can be suppressed.

In the above vehicle control apparatus, an increment of driving force through downshifting may set to be smaller as the vehicle speed is increased. The limiting unit may limit the number of increases of the driving force within the predefined time to a greater number of increases of the driving force as the vehicle speed is increased.

In this configuration, the limit of the number of downshifts within a predefined time can be eased in a case where the increment of driving force through downshifting is small.

In the above vehicle control apparatus, the limiting unit may limit, to the predefined number of times, a number of acceptances of the instruction signal within the predefined time.

In this configuration, the number of acceptances of the downshift instruction signal is limited, and the number of times that downshifting is carried out is limited. The number of increases of the driving force can be limited as a result.

Further, an increment of driving force through downshifting may be set to be smaller as the vehicle speed is increased, and the predefined number of times may be set to be greater as the vehicle speed is increased.

In this configuration, the limit of the number of downshifts within a predefined time can be eased in a case where the increment of driving force through downshifting is small.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 10 is a diagram illustrating a changing driving force as a result of downshifting.

DETAILED DESCRIPTION OF EMBODIMENTS

Figure 1:
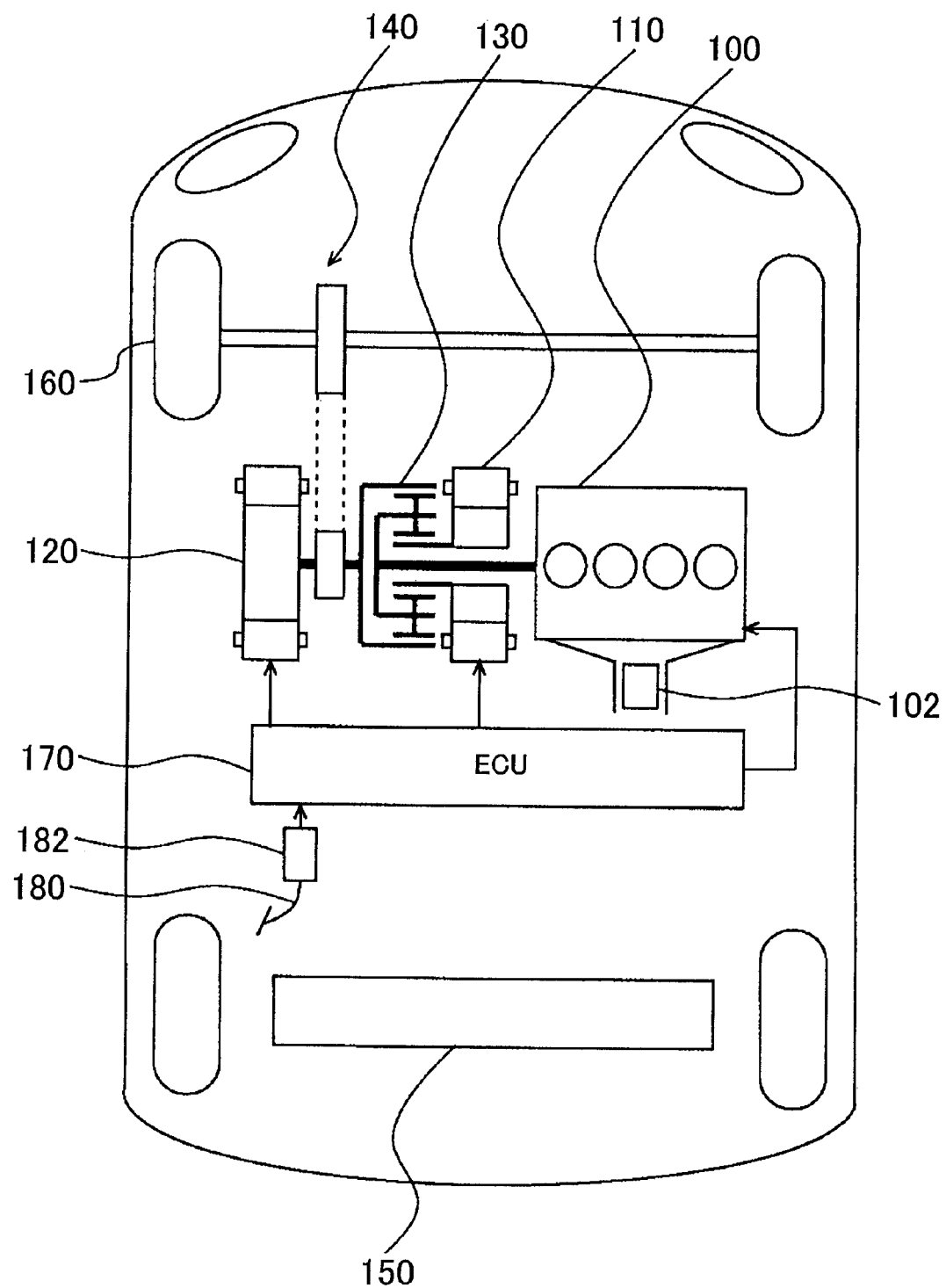
FIG. 1 is a schematic configuration diagram illustrating a hybrid vehicle according to one embodiment of the invention.

Embodiments of the invention are explained next with reference to accompanying drawings. In the explanation below, identical components are denoted by identical reference numerals, and have identical denominations and functions. Accordingly, a detailed explanation thereof will be omitted.

With reference to FIG. 1, a hybrid vehicle is equipped with an engine 100, a first motor generator 110, a second motor generator 120, a motive power splitting mechanism 130, a reducer 140 and a battery 150. The explanation below will deal with an example of a hybrid vehicle, but an electric automobile, equipped with an electric motor alone as a drive source, may also be used.

The engine 100, the first motor generator 110, the second motor generator 120 and the battery 150 are controlled by an ECU 170. The ECU 170 may be divided into a plurality of ECUs.

The vehicle travels by virtue of the driving force from at least either from among the engine 100 and the second motor generator 120. That is, either the engine 100 or the second motor generator 120, or both, is selected automatically as the drive source, in accordance with the operating state.

For instance, the engine 100 and the second motor generator 120 are controlled according to the result of an operation of an accelerator pedal 180 by the driver. If the operation amount of accelerator pedal 180 (accelerator depression amount) is small and the vehicle speed is low, the hybrid vehicle travels using the second motor generator 120 alone as the drive source. In such a case, the engine 100 shuts down. However, the engine 100 may, in some cases, be driven, for instance for the purpose of power generation or the like.

The engine 100 is driven if, for instance, the accelerator depression amount is large and the vehicle speed is high, or if the residual capacity (state of charge (SOC)) of the battery 150 is low. In this case, the hybrid vehicle travels using the engine 100 alone, or with both the engine 100 and the second motor generator 120, as the drive source.

The accelerator depression amount is detected by a depression amount sensor 182, and a signal denoting the detection result is inputted to the ECU 170. As described below, there are instances where the actual accelerator depression amount detected and the control accelerator depression amount that is used for control are dissimilar. The characteristic of the control accelerator depression amount that is outputted in accordance with the actual accelerator depression amount can be modified in accordance with the shift range. The control accelerator depression amount is explained in detail further on.

The engine 100 is an internal combustion engine. A crankshaft, being an output shaft, rotates as a result of combustion of a mixture of fuel and air in a combustion chamber. Exhaust gas that is discharged from the engine 100 is purified in a catalyst 102, and is discharged out of the vehicle. The purifying action of the catalyst 102 is brought out through warming-up to a specific temperature. The catalyst 102 is warmed up by utilizing the heat of the exhaust gas. The catalyst 102 is, for instance, a three-way catalyst.

The engine 100, the first motor generator 110 and the second motor generator 120 are connected by way of the motive power splitting mechanism 130. The motive power that is generated in the engine 100 is split, by the motive power splitting mechanism 130, into two paths. In one of the paths, the front wheels 160 are driven via the reducer 140, and in the other path the first motor generator 110 is driven, to generate power thereby.

The first motor generator 110 is a three-phase AC rotating electric machine provided with a U-phase coil, a V-phase coil and a W-phase coil. The first motor generator 110 generates electric power from the motive power of the engine 100 that is split by the motive power splitting mechanism 130. The electric power generated by the first motor generator 110 is selectively used in accordance with the travel state of the vehicle and in accordance with the residual capacity state of the battery 150. For instance, during ordinary travel, the electric power generated by the first motor generator 110 remains unmodified as electric power, that drives the second motor generator 120. When the SOC of the battery 150 is lower than a value set beforehand, the electric power generated by the first motor generator 110 is stored in the battery 150.

If the first motor generator 110 is functioning as a power generator, the first motor generator 110 generates negative torque. Herein, negative torque denotes torque that constitutes a load to the engine 100. If the first motor generator 110 is functioning as a motor by being supplied with electric power, the first motor generator 110 generates positive torque. Herein, positive torque denotes torque that does not constitute a load to the engine 100, i.e. denotes torque that assists the rotation of the engine 100. The same applies to the second motor generator 120.

The second motor generator 120 is a three-phase AC rotating electric machine provided with a U-phase coil, a V-phase coil and a W-phase coil. The second motor generator 120 is driven by at least either from among electric power stored in the battery 150 and electric power generated by the first motor generator 110.

The driving force of the second motor generator 120 is transmitted to the front wheels 160 via the reducer 140. As a result, the second motor generator 120 assists the engine 100, and the vehicle travels by virtue of the driving force from the second motor generator 120. Rear wheels may be driven instead of, or in addition to, the front wheels 160.

During regenerative braking of the hybrid vehicle, the second motor generator 120 is driven by the front wheels 160, via the reducer 140, and the second motor generator 120 operates as a power generator. As a result, the second motor generator 120 works as a regenerative brake that converts braking energy to electric power. The electric power generated by the second motor generator 120 is stored in the battery 150.

The motive power splitting mechanism 130 is made up of a planetary gear set that includes a sun gear, pinion gears, a carrier and a ring gear. The pinion gears are locked to the sun gear and the ring gear. The carrier is supported in such a manner that the pinion gears can rotate about themselves. The sun gear is coupled to the rotating shaft of the first motor generator 110. The carrier is coupled to the crankshaft of the engine 100. The ring gear is coupled to the rotating shaft of the second motor generator 120 and to the reducer 140.

Figure 2:
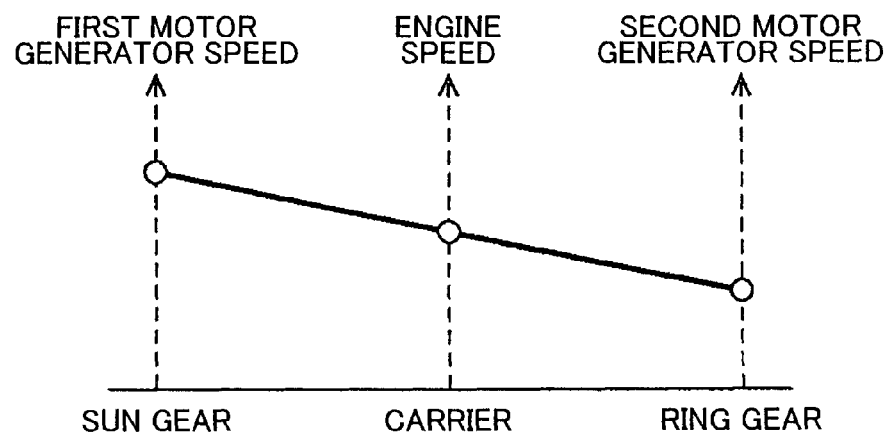
FIG. 2 is a collinear diagram of a motive power splitting mechanism.

The revolutions of the engine 100, the first motor generator 110 and the second motor generator 120 exhibit relationships joined by a straight line in a collinear diagram, as illustrated in FIG. 2, as a result of the coupling of the engine 100, the first motor generator 110 and the second motor generator 120 by way of the motive power splitting mechanism 130 that is made up of a planetary gear set.

Returning to FIG. 1, the battery 150 is an assembled battery that is configured through series connection of a plurality of battery modules that are in turn obtained by integrating together a plurality of battery cells. The voltage of the battery 150 is, for instance, about 200 V. Capacitors may be used instead of, or in addition to, the battery 150.

Figure 3:
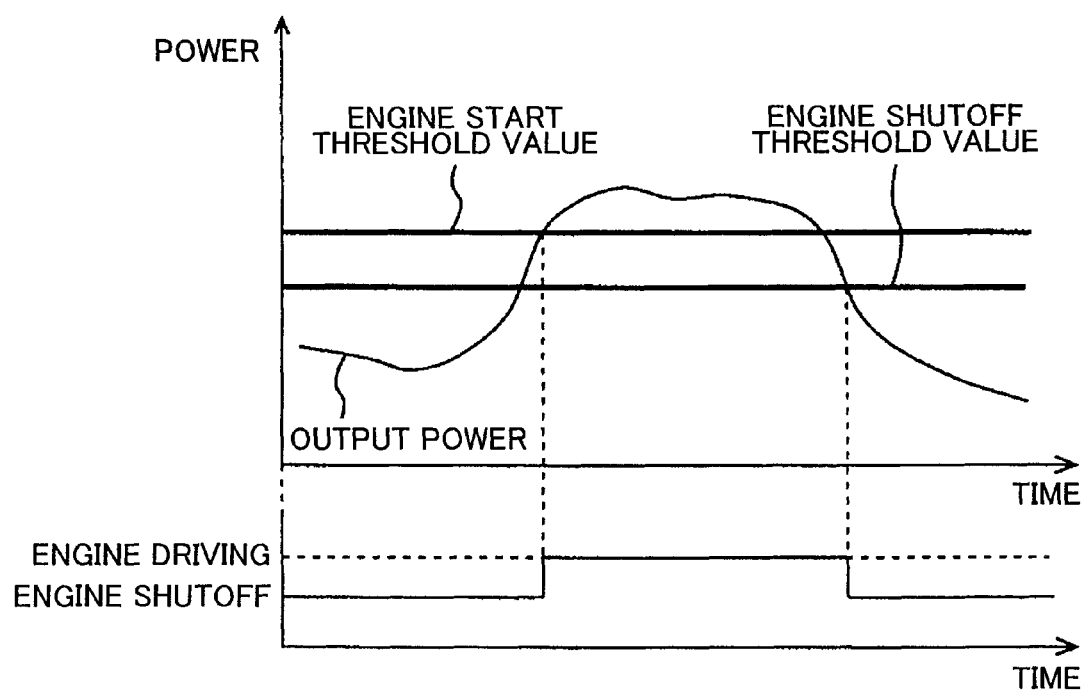
FIG. 3 is a diagram illustrating a period of engine driving and a period of engine shutdown.

A form of control of the engine 100 will be explained next with reference to FIG. 3. As illustrated in FIG. 3, the hybrid vehicle travels using only the driving force of the second motor generator 120 when the output power of the hybrid vehicle is smaller than an engine start threshold value.

The output power is set as the power that is used for travel of the hybrid vehicle. The output power is calculated, for instance, by the ECU 170, according to a map that has at least the control accelerator depression amount as a parameter. In an example, the output power is set so as to increase as the control accelerator depression amount increases. The method for calculating the output power is not limited to the above-described one. Instead of the output power there can be used, for instance, torque, acceleration, driving force, or control accelerator depression amount.

The engine 100 is driven when the output power of the hybrid vehicle is equal to or greater than an engine start threshold value. As a result, the hybrid vehicle travels using the driving force of the engine 100, in addition to or instead of the driving force of the second motor generator 120. The electric power that is generated by the first motor generator 110 using the driving force of the engine 100 is directly supplied to the second motor generator 120.

Figure 4:
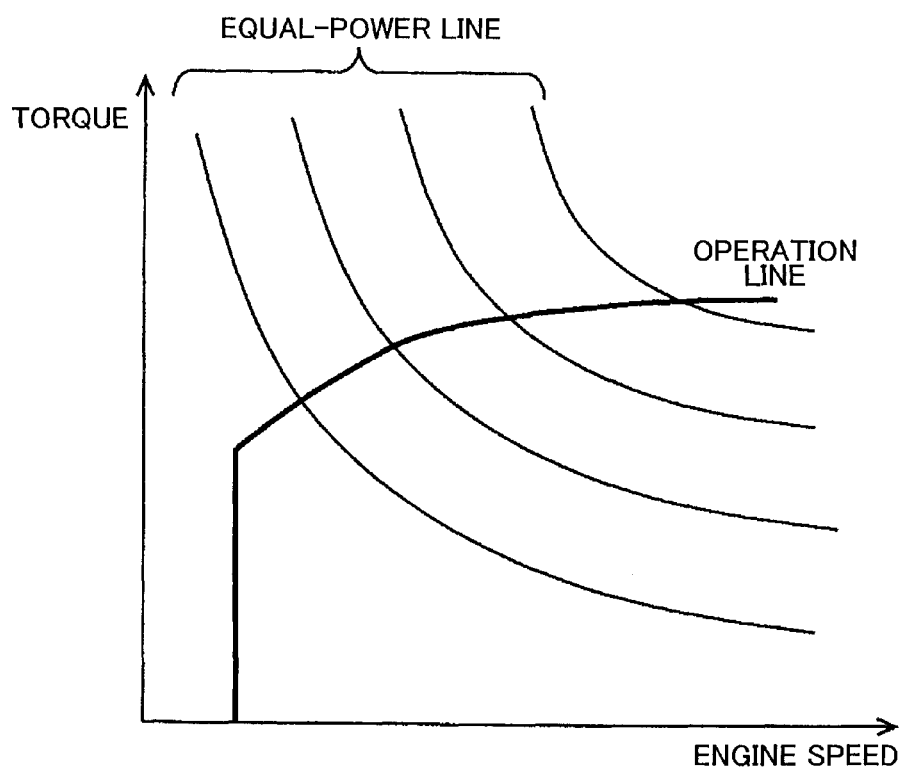
FIG. 4 is a diagram illustrating an operation line of an engine.

As illustrated in FIG. 4, the operation points of the engine 100, i.e. engine speed NE and output torque TE are determined by intersections between output power and an operation line.

The output power is represented by equal-power lines. The operation line is established beforehand by a developer on the basis of experimental results and simulation results. The operation line is set in such a manner that the engine 100 can deliver drive with optimal (smallest) fuel consumption. That is, optimal fuel consumption is realized through engine 100 driving along the operation line.

Figure 5:
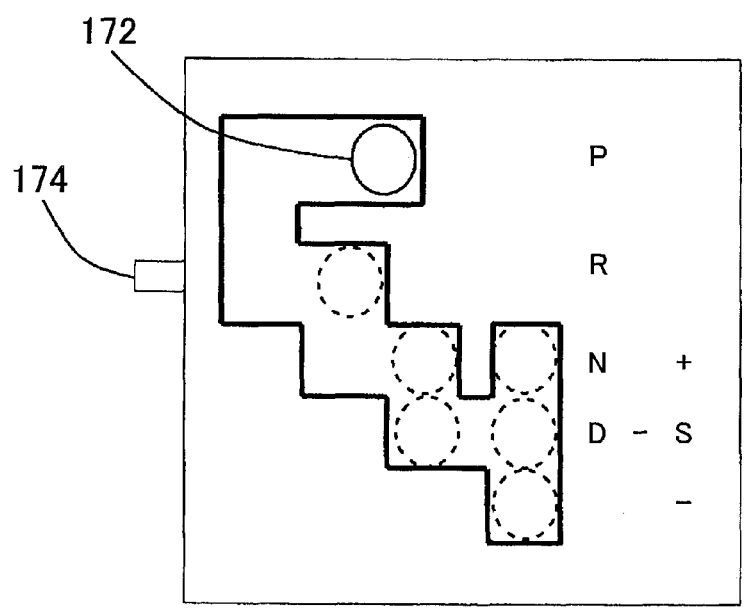
FIG. 5 is a diagram illustrating a shift lever and a shift position.

Control modes of the engine 100, the first motor generator 110 and the second motor generator 120 are explained next with reference to FIG. 5. In the embodiment, the control mode of the engine 100, the first motor generator 110 and the second motor generator 120 is selected in accordance with operations performed by the driver on a shift lever 172. As illustrated in FIG. 5, the shift lever 172 moves along a shift gate. The control mode is selected according to a position PSH of the shift lever 172.

The position PSH of the shift lever 172 is detected by a position sensor 174. The position sensor 174 determines whether a contact that is provided at a position corresponding to the shift position is on or off, to detect thereby the position PSH of the shift lever 172. A signal denoting the position PSH as detected by the position sensor 174 is inputted to the ECU 170.

When the position PSH of the shift lever 172 is a "parking (P)" position or "neutral (N)" position, the engine 100, the first motor generator 110 and the second motor generator 120 are controlled in such a manner that the vehicle has no driving force. In this case, control itself of the engine 100, the first motor generator 110 and the second motor generator 120 may be discontinued.

When the position PSH of the shift lever 172 is a "reverse (R)" position, the engine 100, the first motor generator 110 and the second motor generator 120 are controlled in such a manner that the vehicle backs up by virtue of a driving force that corresponds to the accelerator pedal depression amount. More specifically, control is performed so that the engine 100 shuts down and the vehicle backs up with only the second motor generator 120 as a drive source. As an example, the actual accelerator depression amount detected by the depression amount sensor 182 is used, as-is, as the control accelerator depression amount.

When the position PSH of the shift lever 172 is a "drive (D)" position there is selected an automatic shift mode. In the automatic shift mode, the engine 100, the first motor generator 110 and the second motor generator 120 are controlled in such a manner that the vehicle moves forward by virtue of a driving force that corresponds to the accelerator pedal depression amount. In the automatic shift mode, as an example, the actual accelerator depression amount detected by the depression amount sensor 182 is used, as-is, as the control accelerator depression amount.

Figure 6:
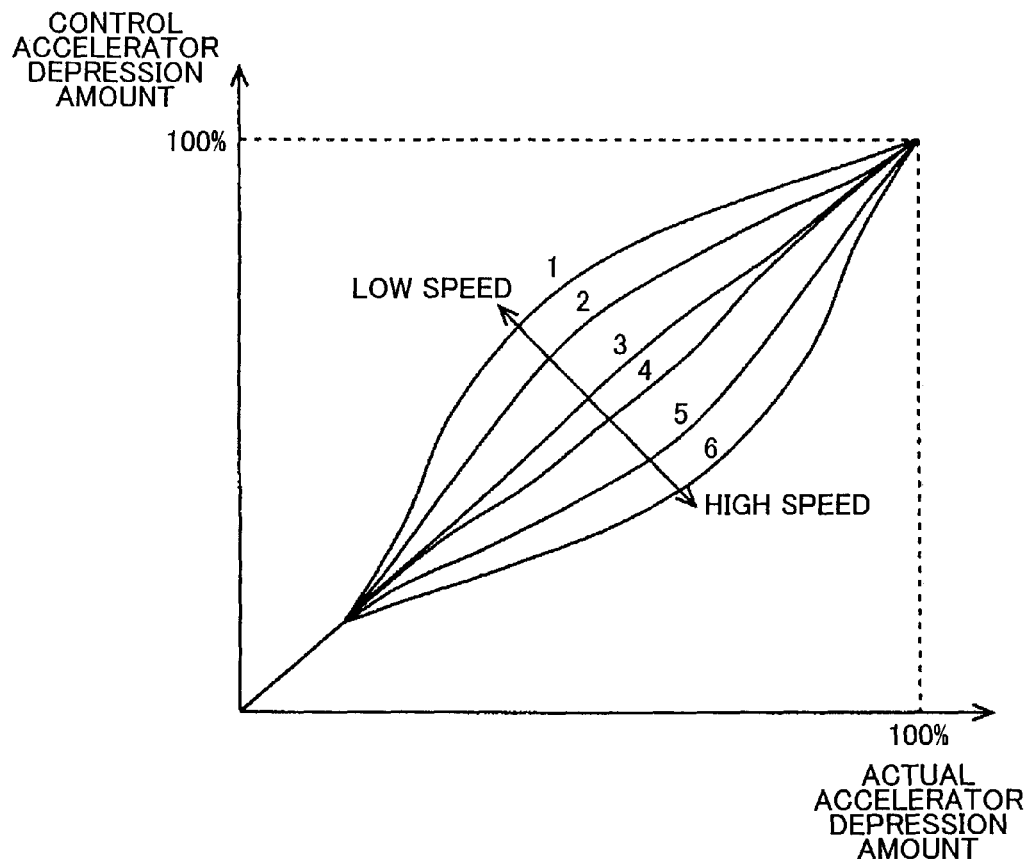
FIG. 6 is a diagram illustrating a relationship between a detected actual accelerator depression amount and a control accelerator depression amount that is used for control.

When the position PSH of the shift lever 172 is a "sequential shift (S)" position there is selected a manual transmission mode. In the manual transmission mode, the shift range can be modified manually within, for instance, a range from 1 to 6, as a result of a shifting operation whereby the shift lever 172 is moved back and forth. In the manual transmission mode, a characteristic of the control accelerator depression amount with respect to the actual accelerator depression amount is modified in accordance with the selected shift range, as illustrated in FIG. 6.

As an example, the lower the shift range is (the further on a low-speed side), the greater becomes the outputted control accelerator depression amount with respect to the actual accelerator depression amount that is detected by the depression amount sensor 182. As a result, if the actual accelerator depression amount is constant, then the driving force of the vehicle is increased through upshifting in the manual transmission mode. In the embodiment, as an example, the characteristic of the control accelerator depression amount is established in such a manner that the increment of driving force through downshifting becomes smaller the higher the vehicle speed is.

In essence, sequential shift control is performed wherein the driving force of the hybrid vehicle is controlled so as to change stepwise through displacement of the shift lever 172 back and forth.

In a case where, for instance, the position PSH of the shift lever 172 is an "S" position, the shift range is increased through upshifting when the driver operates the shift lever 172 towards the vehicle front. An upshift instruction signal is outputted by the position sensor 174, and the shift range increases by one gear, every time that the shift lever 172 is operated once towards the vehicle front.

Conversely, in a case where the position PSH of the shift lever 172 is an "S" position, the shift range is lowered through upshifting when the driver operates the shift lever 172 towards the rear of the vehicle while the vehicle is decelerating. A downshift instruction signal is outputted by the position sensor 174, and the shift range drops by one gear, every time that the shift lever 172 is operated once towards the vehicle rear.

Figure 7:
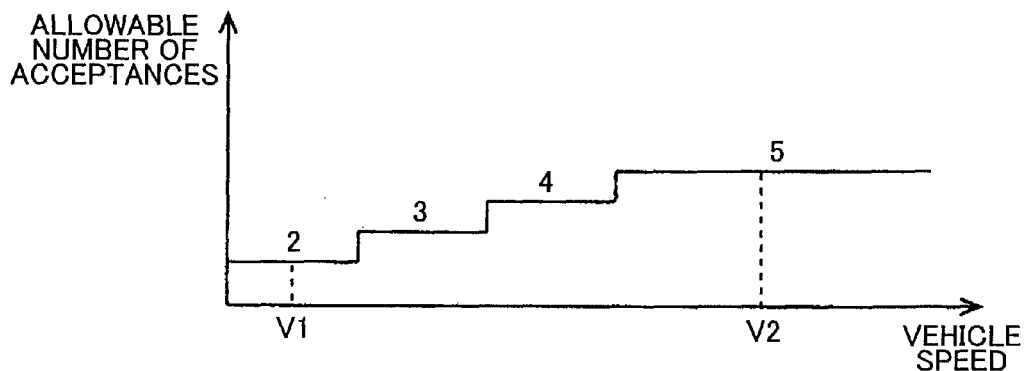
FIG. 7 is a diagram illustrating the number of times a downshift instruction signal is accepted within a predefined time.

In the embodiment, the number of times that downshift is performed within a predefined time is limited to a predefined number of times. In a more specific example, the number of times that the ECU 170 accepts the downshift instruction signal from the position sensor 174 within a predefined time is limited to be no greater than a predefined number of times. As illustrated in FIG. 7, the number of times that the downshift instruction signal is accepted within a predefined time is established to be greater the higher the vehicle speed is. For instance, the number of times may be established in such a manner that for a vehicle speed V1, a downshift instruction signal is accepted up to two times in one second, while for a vehicle speed V2 that is higher than the vehicle speed V1, the downshift instruction signal is accepted up to five times in one second. As a result, the number of downshifts performed within a predefined time is limited to a number of times that is greater the higher the vehicle speed is.

Figure 8:
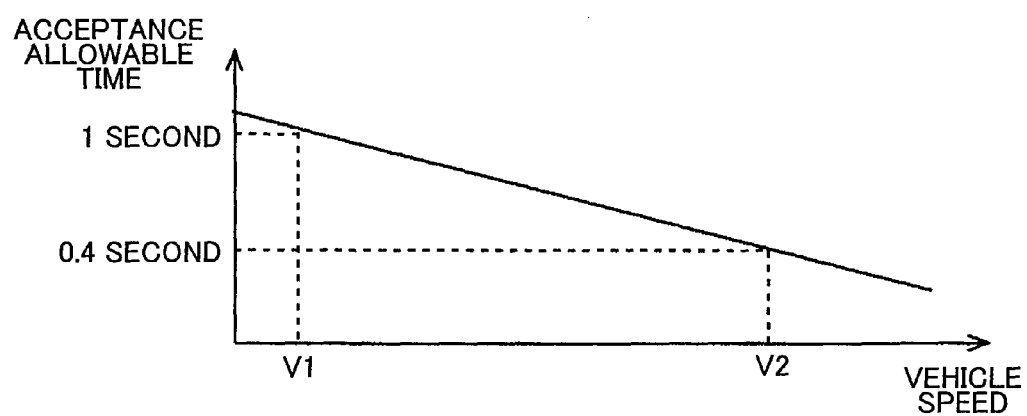
FIG. 8 is a diagram illustrating the time over which a downshift instruction signal, is accepted a predefined number of times.

As illustrated in FIG. 8, the time over which the downshift instruction signal is accepted a predefined number of times may be set to be shorter the higher the vehicle speed is. For instance, the number of times may be set in such a manner that for the vehicle speed V1, the downshift instruction signal is accepted up to two times in one second, while for a vehicle speed V2 the downshift instruction signal is accepted up to two times in 0.4 seconds. In this manner as well, the number of downshifts within a predefined time is limited to a number of times that is greater the higher the vehicle speed is.

A configuration is also possible wherein at a predefined vehicle speed or below, the number of times that the downshift instruction signal is accepted within a predefined time is limited to be no greater than a predefined number of times, while at a vehicle speed that is higher than the predefined vehicle speed, the number of times that the downshift instruction signal is accepted is not limited.

Figure 9:
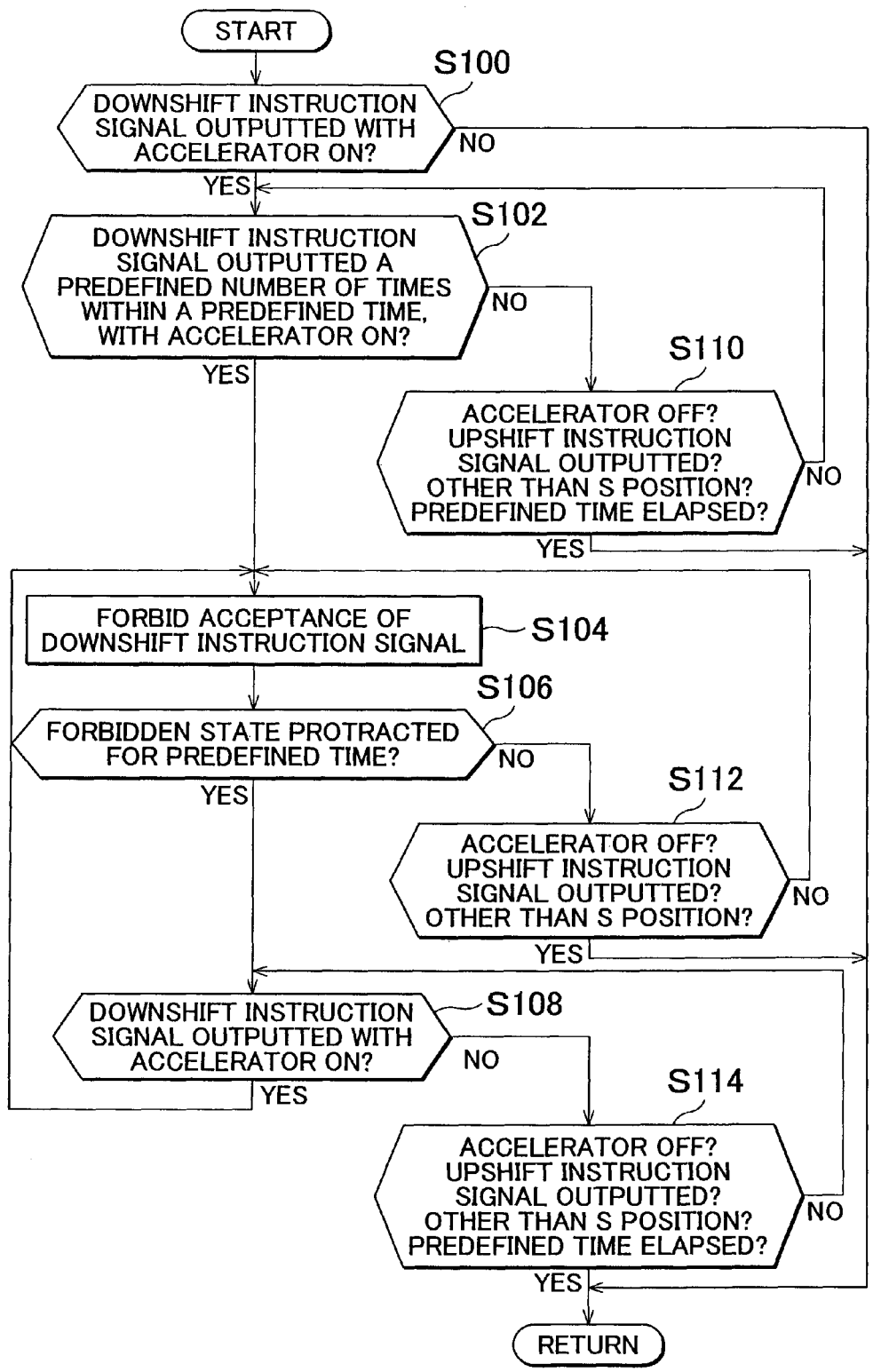
FIG. 9 is a flowchart illustrating a process performed by an electronic control unit (ECU)

An explanation follows next, with reference to FIG. 9, on the process that the ECU 170 executes in order to limit the acceptance of the downshift instruction signal in the manual transmission mode in the embodiment. The process explained below may be carried out by software, by hardware, or by software and hardware collaboratively.

In S100, it is determined whether or not a downshift instruction signal is outputted in a state where the accelerator pedal 180 is being operated (actual accelerator depression amount greater than zero). If a downshift instruction signal is outputted in a state where the accelerator pedal 180 is being operated (YES in S100), then in S102 it is determined whether or not the downshift instruction signal is outputted a predefined number of times (for instance, two times) within a predefined time (for instance, one second) in a state where the accelerator pedal 180 is being operated. If the downshift instruction signal is outputted a predefined number of times within a predefined time in a state where the accelerator pedal 180 is being operated (YES in S102), then, in S104, acceptance of the downshift instruction signal is forbidden.

The downshift instruction signal that is outputted until acceptance of the downshift instruction signal is forbidden is accepted by the ECU 170. As a result, downshift is performed a number of times no greater than the predefined number of times.

When a state where acceptance of the downshift instruction signal is forbidden has lasted for a predefined time (YES in S106), then in S108 it is determined whether or not a downshift instruction signal is outputted in a state where the accelerator pedal 180 is being operated. If the downshift instruction signal is outputted in a state where the accelerator pedal 180 is being operated (YES in S108), then the downshift instruction signal at this time is accepted, downshift is performed, and in S104 acceptance of the downshift instruction signal is forbidden again.

On the other hand, if the downshift instruction signal is not outputted a predefined number of times within a predefined time in a state where the accelerator pedal 180 is being operated (NO in S102), and if the accelerator pedal 180 is switched off (actual accelerator depression amount is set to zero), an upshift instruction signal is outputted, the shift lever 172 is operated to a position other than the "S" position, or a predefined time (for instance, one second) has elapsed (YES in S110), then the process returns to S100.

Before the state in which acceptance of the downshift instruction signal is forbidden has protracted for a predefined time (NO in S106), and if the accelerator pedal 180 is switched off, an upshift instruction signal is outputted, or the shift lever 172 is operated to a position other than the "S" position (YES in S112), then the process returns to S100.

Therefore, during the lapse of time where the state in which acceptance of the downshift instruction signal is forbidden lasts for a predefined time (NO in S106), the downshift instruction signal is not accepted (S104), even if the downshift instruction signal is outputted, in a state where the accelerator pedal 180 has been operated. As a result, there is performed no downshift for a greater number of times than the predefined number of times (for instance, two times).

If the downshift instruction signal is not outputted (NO in S108) after a the state where acceptance of the downshift instruction signal is forbidden has lasted for a predefined time (YES in S106), then if the accelerator pedal 180 is switched off, an upshift instruction signal is outputted, the shift lever 172 is operated to a position other than the "S" position, or a predefined time (for instance, one second) has elapsed (YES in S114), the process returns to S100.

In the embodiment, thus, there is limited the number of increases of the driving force through downshifting within a predefined time. As a result, this allows limiting the increment of driving force through downshifting. Accordingly, it becomes possible to suppress excessive increases of driving force due to downshifting in a manual transmission mode.

Alternatively, as illustrated in FIG. 10, a configuration is also possible wherein only the number of increases of the driving force within a predefined time is limited to be no greater than a predefined number of times, without limiting the number of acceptances of the downshift instruction signal. In other words, all downshift instruction signals may be accepted by the ECU 170, and the shift range be modified, while the rate of change of the characteristic of the control accelerator depression amount with respect to the actual accelerator depression amount, i.e. the rate of change of the driving force, is eased. As an example, FIG. 10 illustrates an instance of the driving force at a time where the downshift instruction signal is outputted in a state where the actual accelerator depression amount as detected by the depression amount sensor 182 is constant. As an example, FIG. 10 illustrates an instance wherein downshifting is performed three times in one second, and the shift range is modified, from 6 to 3. Meanwhile, the driving force is increased just two times in one second, and the driving force corresponding to the third downshift (shift range from 4 to 3) is not increased, or is delayed.

While the invention has been described with reference to example embodiments thereof, it is to be understood that the invention is not limited to the described example embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

What is claimed is:

1. A vehicle control apparatus in which a driving force is increased through downshifting in a manual transmission mode, comprising:
   a controller configured to:
   output a downshift instruction signal; and
   limit, to a predefined number of times, a number of increases of the driving force through downshifting within a predefined time.

2. The vehicle control apparatus according to claim 1, wherein
   an increment of driving force through downshifting is smaller as the vehicle speed is increased, and the controller limits the number of increases of the driving force within the predefined time to a greater number of increases of the driving force as the vehicle speed is increased.

3. The vehicle control apparatus according to claim 1, wherein
   when an accelerator pedal is on, and the downshift instruction signal is outputted beyond a predefined number of times within the predefined time, the controller is configured to limit the number of increases of the driving force through downshifting to the predefined number of times.

4. The vehicle control apparatus according to claim 1, wherein
the controller is configured to limit, to the predefined number of times, a number of acceptances of the instruction signal within the predefined time.

5. The vehicle control apparatus according to claim 4, wherein
the increment of driving force through downshifting is smaller as the vehicle speed is increased, and the predefined number of times is greater as the vehicle speed is increased.

6. The vehicle control apparatus according to claim 1, wherein
the predefined number of times is two times.

7. The vehicle control apparatus according to claim 1, wherein
the controller is configured to modify a characteristic of a control accelerator depression amount with respect to an actual accelerator depression amount, in accordance with the selected shift range.

8. A vehicle control apparatus in which a driving force is increased through downshifting in a manual transmission mode, comprising:
a controller configured to:
output a downshift instruction signal; and
limit, to a predefined number of times, greater than one, a number of increases of the driving force through downshifting within a predefined time.

\* \* \* \* \*